Figure 1:
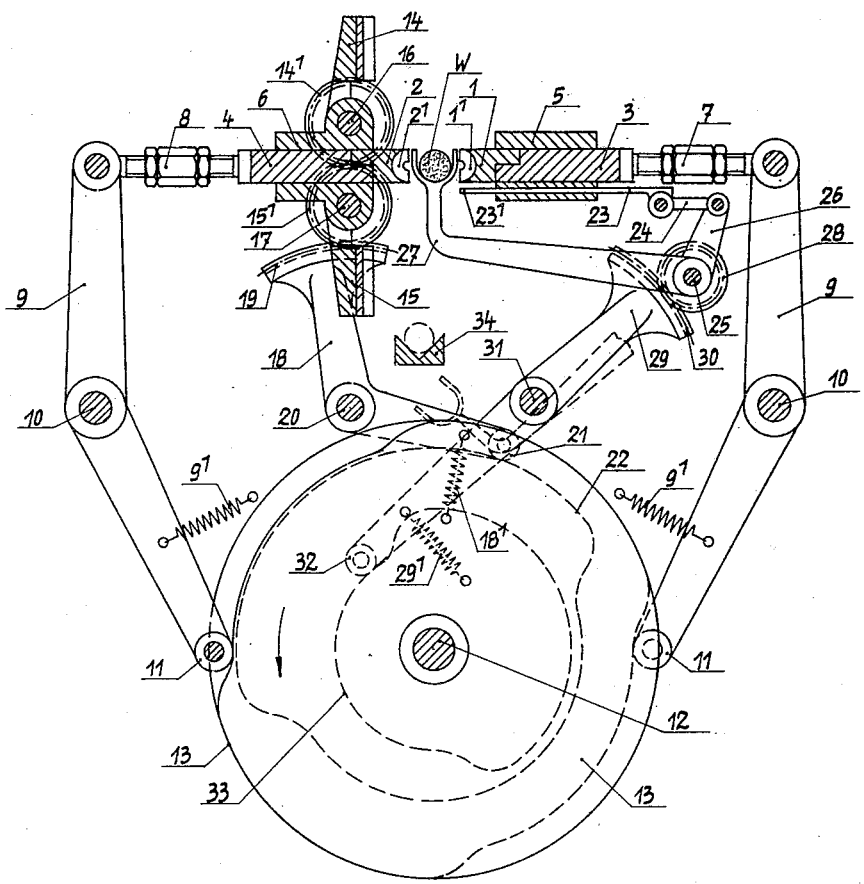

Jan. 5, 1932.  F. H. B. STELZER  1,839,422
APPARATUS FOR SHAPING CIGAR BUNCHES
Filed Feb. 21, 1930   4 Sheets-Sheet 1

Jan. 5, 1932.   F. H. B. STELZER   1,839,422
APPARATUS FOR SHAPING CIGAR BUNCHES
Filed Feb. 21, 1930   4 Sheets-Sheet 2

Inventor.
Franz Heinrich Benno Stelzer
by Max D. Ordmann
Attorney

Jan. 5, 1932.   F. H. B. STELZER   1,839,422
APPARATUS FOR SHAPING CIGAR BUNCHES
Filed Feb. 21, 1930   4 Sheets-Sheet 3

Jan. 5, 1932.                F. H. B. STELZER                1,839,422
                    APPARATUS FOR SHAPING CIGAR BUNCHES
                    Filed Feb. 21, 1930      4 Sheets-Sheet 4

Inventor
Franz Heinrich Benno Stelzer
by Max D. Ordmann
   Attorney

Patented Jan. 5, 1932

1,839,422

UNITED STATES PATENT OFFICE

FRANZ HEINRICH BENNO STELZER, OF DRESDEN, GERMANY, ASSIGNOR TO THE FIRM "UNIVERSELLE" CIGARETTENMASCHINENFABRIK J. C. MULLER & CO., OF DRESDEN, GERMANY

APPARATUS FOR SHAPING CIGAR BUNCHES

Application filed February 21, 1930, Serial No. 430,273, and in Germany February 22, 1929.

This invention relates to apparatus for shaping cigar bunches.

In the production of cigar bunches it is usual to pre-form the bunch and to introduce it into a shaping mould in which it is pressed to its final form.

Usually the shaping mould is formed of two shaping jaws movable towards one another in a horizontal direction and so shaped as in their closing position to present the final form of the bunch. It is also usual to deliver the pre-formed bunch to the shaping jaws by means of grippers and to remove the completed bunch from the shaping mould by grippers.

In all known bunch presses however the pressing jaws are movable relatively to one another or are hingedly connected, with the result that on the jaws coming together the bunch is spread so that parts are squeezed out laterally from the shaping mould resulting in the production of goods which must be discarded.

In accordance with the present invention the shaping mould consists of four jaws arranged in pairs pressed towards one another and moving in directions intersecting at right angles the facing portions of which correspond to the final form of the bunch and the sliding surfaces coming into contact are shaped to correspond with this profile.

In other words the bunch passes into a pocket or chamber which is then closed on all sides and the walls of which are shaped throughout to the final form of the bunch so that by bringing together the main jaws the bunch is transformed positively into its final form without any portions of the bunch being squeezed out laterally.

In order that the bunch can first be introduced into the mould which is closed before the main pressing jaws are brought together one pair of the jaws is carried by swinging arms, in order after they are moved into the open position to provide space for the insertion of the pre-formed bunch.

There are provided two horizontally relatively movable main pressing jaws and two auxiliary pressing jaws movable about horizontal axes and a support in such manner that with the main jaws and the auxiliary jaws open the bunch introduced between the main pressing jaws rests on the support whereupon the auxiliary pressing jaws move into operative position and thereby form a closed chamber the walls of which exactly fit the final form of the bunch.

Figure 2:
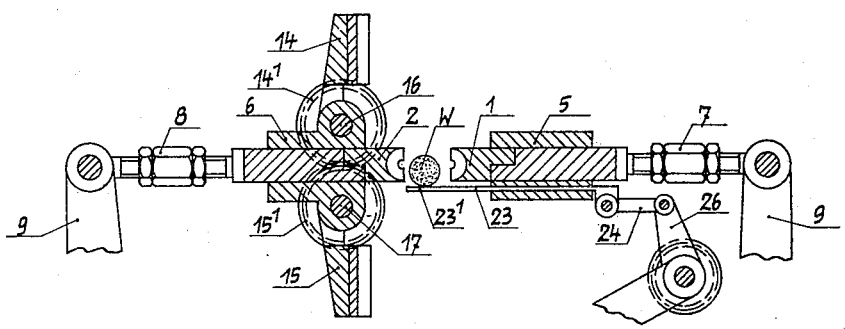
Figure 3:
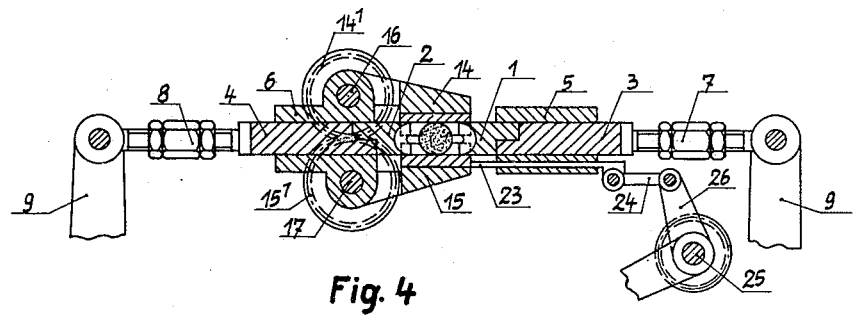
Figure 4:
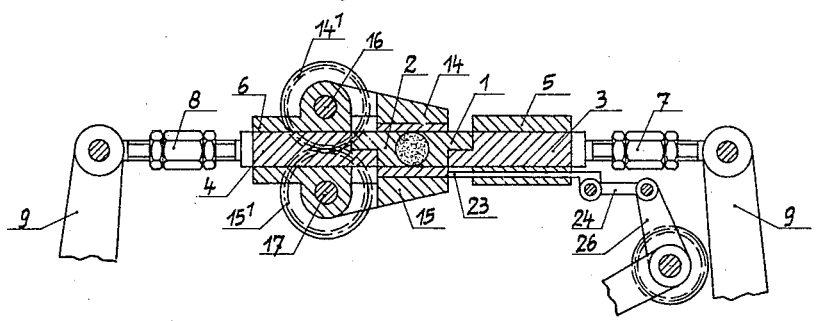
Figures 5, 6:
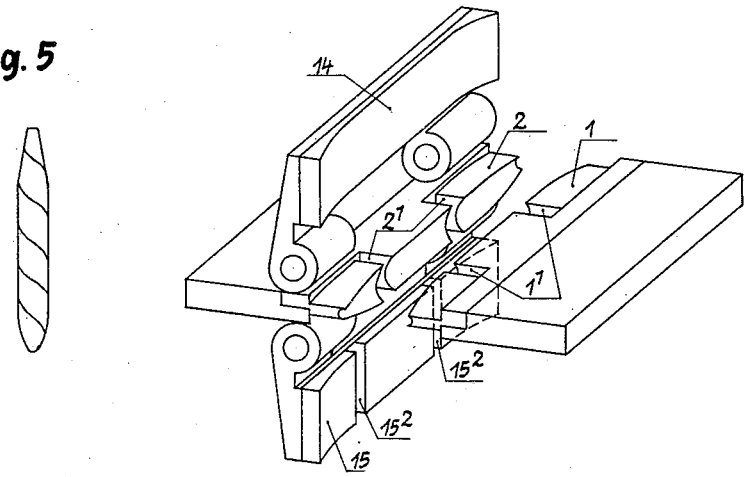

The invention is illustrated in the accompanying drawings in which Fig. 1 is a vertical longitudinal section through the device with the means for operating its parts in the position in which the completed bunch is removed from the shaping mould Fig. 2 shows also in vertical longitudinal section the apparatus in the position in which a new bunch is introduced, the operating means being omitted, Fig. 3 shows the apparatus also in vertical longitudinal section in the position in which the shaping mould is closed after the introduction of the new bunch, Fig. 4 shows in vertical longitudinal section the device in the position in which the bunch is pressed, Fig. 5 shows the finished bunch as it is removed from the open shaping mould, Fig. 6 finally shows in perspective the four jaws of the shaping press in open position, while Figs. 7 to 11 show further modifications.

The two main shaping jaws 1 and 2, the recesses 1' and 2' in which correspond to the bunch shown in Fig. 5, are mounted on slides 3 and 4 and are arranged to move longitudinally in guides 5 and 6. To these slides are connected longitudinally movable rods 7 and 8 which are rotatably mounted on the levers 9. The levers 9 are movable about the pivots 10 and co-operate by means of rollers 11 with the cam discs 13 mounted on the shaft 12. The two auxiliary shaping jaws 14 and 15 turn about pivots 16 and 17 which are secured to the guide 6. The auxiliary shaping jaws are provided with pinions 14' and 15' which mesh with one another. The toothed segment 19 secured to the lever 18 meshes with the lower pinion 15'. This lever turns about the pivot 20 and co-operates by means of its roller 21 with the cam disc 22 mounted on the shaft 12. In the guide 5 is arranged also a longitudinally movable support 23, the forward end 23' of which is provided with two tines. At its rear end the support is attached by means of a link 24 with a lever 26 mounted on the shaft 25. There is also rigidly mounted on the shaft a forked gripper 27 and a pinion 28 which meshes with the toothed segment 30 on the lever 29. The lever 29 turns about the pivot 31 and co-operates by means of a roller 32 with the cam disc 33. The levers 9, 18 and 29 are pulled by means of suitable springs 9', 18', and 29' into operative position i. e. against the corresponding cam track.

The operation of the apparatus is as follows:

After the complete bunch has been removed from the open device the support 23 is moved forward and the pre-formed bunch W is laid on this (Fig. 2) by known means. Now the jaws 14 and 15 are closed and the auxiliary jaws co-operating with the main jaws bear thereon (see Fig. 3).

Recesses $15^2$ are provided for the forked support 23, as shown in Fig. 6 in the lower auxiliary jaw 15. The main shaping jaws 1 and 2 then move towards one another as shown in Fig. 4 and give the form of the bunch shown in Fig. 5. The two auxiliary jaws 14 and 15 which are shaped to correspond to the main shaping jaws prevent any squeezing out of the tobacco along the surface of the bunch at their meeting point.

After pressure has been applied to the bunch for the proper time the two auxiliary jaws return to their initial position. The toothed segment 30 controlled by the cam disc 33 now turns the two levers 26 and 27 so that while the support 23 returns to the position shown in Fig. 1 the forked gripper moves between the recesses 1' and 2' provided on the main shaping jaws 1 and 2 (see Fig. 6) and holds the bunch in the middle position while the two main pressing jaws 1 and 2 return to their initial position. Then the forked gripper 27 moves into the position shown in dotted lines in Fig. 1 and lays the bunch on a prismatic support 34 which feeds the same to the devices intended for further treatment of the bunch.

Figure 7:
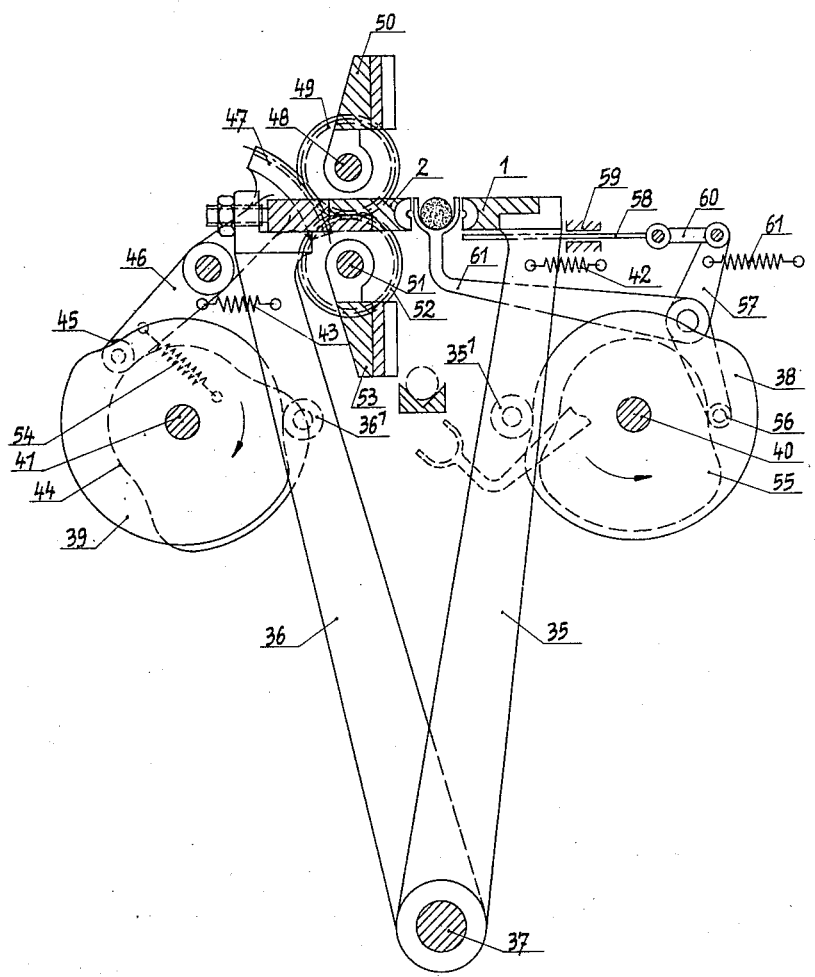

In the embodiment shown in Fig. 7 the two main pressing jaws 1 and 2 are mounted on two rock levers 35 and 36 which pivot about a common pivot 37. These rocking levers are comparatively long so that the movement of the two shaping jaws will be practically rectilinear. The rock levers are provided with rollers 35' and 36' which co-operate with cam discs 38 and 39 mounted on shafts 40 and 41. The springs 42 and 43 engaging the rock levers pull them always into operative position. On the shaft 41 is also mounted a cam disc 44 with which the roller 45 on the double-armed lever 46 co-operates. The double-armed lever is provided with a toothed segment 47 which meshes with the pinion 49 mounted on the spindle 48. The pinion 49 which is rigidly connected with the auxiliary jaw 50 meshes with the pinion 52 mounted on the spindle 51 which is rigidly connected with the jaw 53. The double armed lever 46 is continuously pulled against the cam 44 by the spring 54. On the shaft 40 is also mounted the cam disc 55 which co-operates with the roller 56 on the bell crank lever 57. The support 58 is movable on the guide 59 and is connected by the link 60 with the double-armed lever 57. There is also connected with the double-armed lever 57 the forked gripper 61 which is identical with the gripper 27 shown in Figs. 1 to 6. The spring 61 tends to press the roller 56 against the cam surface 55.

The modus operandi of this apparatus is exactly the same as that described with reference to Figs. 1 to 6.

Figure 8:
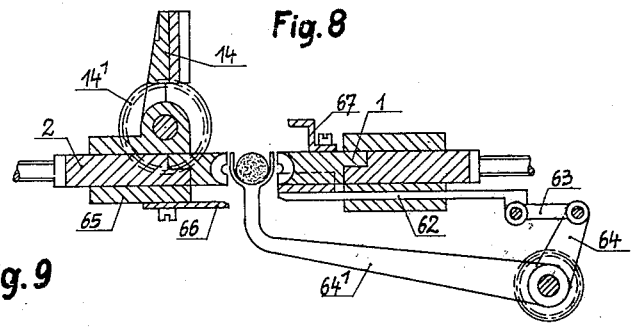
Figure 9:
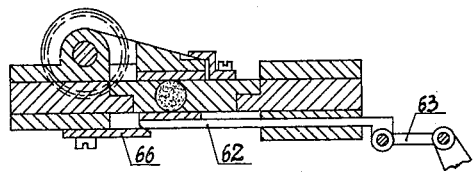

Figs. 8 and 9 show a modified construction in two positions in which the support 62 also replaces the lower auxiliary shaping jaw. This support is operated in known manner through a link 63 by means of a bell crank lever 64 one arm 64' of which is also formed as a forked gripper. In order to prevent separation of the auxiliary shaping jaws during the pressing operation there is screwed on the guide 65 of the main shaping jaw 2 a locking plate 66 behind which the support 62 is disposed when in operative position (as shown in Fig. 9). The locking member 67 for the auxiliary shaping jaw 14 which is operated in known manner by means of a toothed segment co-operating with the pinion 14' is mounted on the main shaping jaw 1. The support 62 must, of course, be provided with recesses for the passage of the forked gripper.

Figure 10:
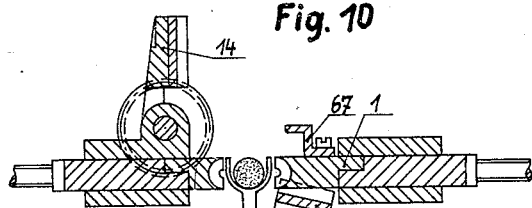
Figure 11:
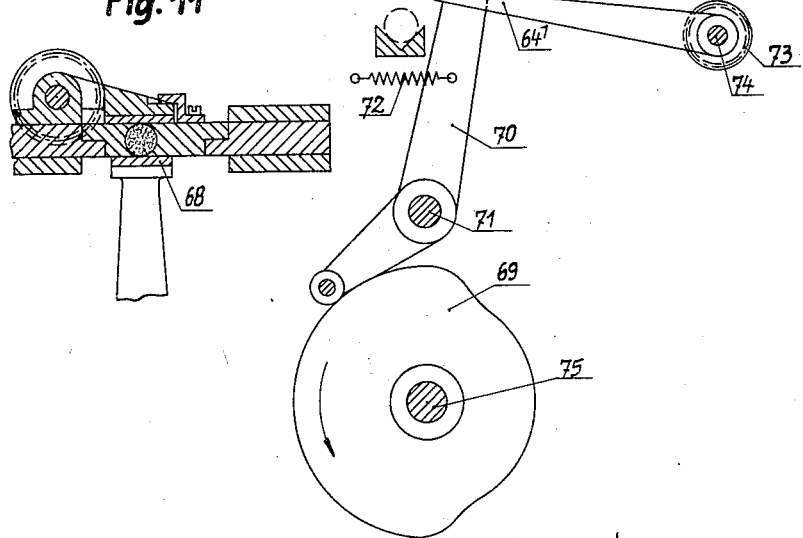

In the embodiment shown in Figs. 10 and 11 the lower shaping jaw 68 is mounted on a bell crank lever 70 operated by the cam disc 69. The bell crank lever turns about the pivot 71 and is drawn by means of the spring 72 into engaging position with the cam 69. Although the main shaping jaw 1 is provided with a locking member 67 for the auxiliary shaping jaw 14 in this construction a projection for the auxiliary shaping jaw 68 is not necessary with this construction as the line of pressure lies in the direction of the pivot 71.

It should be mentioned that the forked gripper 64' is rigidly connected with a pinion 73 mounted on the spindle 74 and the pinion 73 is driven in any suitable manner (not shown) from the shaft 75 by means of a cam disc.

I claim:

1. Apparatus for shaping cigar bunches comprising a mould said mould consisting of four jaws adapted to move in pairs towards one another in directions at right angles, one pair of said jaws being slidable, the adjacent faces of said jaws corresponding to the final form of the bunch and the sliding faces coming in contact being shaped to correspond to this profile, and means for moving each of said jaws.

2. Apparatus for shaping cigar bunches comprising a mould said mould consisting of four jaws adapted to move in pairs towards one another in directions at right angles, a pair of said jaws being carried by rocking arms and the other pair of said jaws being slidable, the adjacent faces of said jaws corresponding to the final form of the bunch and the sliding faces coming in contact being shaped to correspond to this profile, and means for moving each of said jaws.

3. Apparatus for shaping cigar bunches comprising a mould, said mould consisting of two main shaping jaws mounted to move relatively to one another in a horizontal plane and two auxiliary shaping jaws rotatable about horizontal axes and a suitably operated support.

4. Apparatus for shaping cigar bunches comprising a mould, said mould consisting of two main shaping jaws mounted to move relatively to one another in a horizontal plane and two auxiliary shaping jaws rotatable about horizontal axes, a suitably operated support, said support consisting of a rake, and said auxiliary jaws being formed with passages for the tines of said rake.

5. Apparatus for shaping cigar bunches comprising a mould, said mould consisting of two main shaping jaws mounted to move relatively to one another in a horizontal plane and two auxiliary shaping jaws rotatable about horizontal axes, a suitably operated support, said support consisting of a rake, said auxiliary jaws being formed with passages for the tines of said rake and means for feeding the finished bunch, said means comprising a forked gripper having tines adapted to enter slots in the main shaping jaws and embrace the completed pressed bunch and acting as a stripper to hold it and then lead it to a delivery station by movement of the gripper.

6. Apparatus for shaping cigar bunches comprising a mould, said mould consisting of two main shaping jaws mounted to move relatively to one another in a horizontal plane and two auxiliary shaping jaws rotatable about horizontal axes, a suitably operated support, said support consisting of a rake, said auxiliary jaws being formed with passages for the tines of said rake, means for feeding the finished bunch said means comprising a forked gripper having tines adapted to enter slots in the main shaping jaws and embrace the completed pressed bunch and acting as a stripper to hold it and then lead it to a delivery station by movement of the gripper, a driving shaft for said gripper, a toothed sector operating said gripper, a pinion in mesh with said toothed sector and mounted on said driving shaft and a lever engaging by means of an intermediate member the support.

7. Apparatus for shaping cigar bunches comprising a mould, said mould consisting of two main shaping jaws mounted to move relatively to one another in a horizontal plane and two auxiliary shaping jaws rotatable about horizontal axes, a suitably operated support, said support consisting of a rake, said auxiliary jaws being formed with passages for the tines of said rake, means for feeding the finished bunch, said means comprising a forked gripper having tines adapted to enter slots in the main shaping jaws and embrace the completed pressed bunch and acting as a stripper to hold it and then lead it to a delivery station by movement of the gripper, a driving shaft for said gripper, a toothed sector operating said gripper, a pinion in mesh with said toothed sector and mounted on said driving shaft, a lever engaging by means of an intermediate member the support, cam discs mounted on said driving shaft and means controlled by said cam discs for operating the shaping jaws, the support and the gripper.

8. Apparatus for shaping cigar bunches comprising a mould, said mould consisting of two main shaping jaws mounted to move relatively to one another in a horizontal plane and two auxiliary shaping jaws rotatable about horizontal axes, a suitably operated support, said support consisting of a rake, said auxiliary jaws being formed with passages for the tines of said rake and means for feeding the finished bunch, said means comprising a forked gripper having tines adapted to enter slots in the main shaping jaws and embrace the completed pressed bunch and acting as a stripper to hold it and then lead it to a delivery station by movement of the gripper, said main shaping jaws being carried by rock levers, said rock levers rotatable about a common pivot, said rock levers being each operated by a cam disc, the one cam disc controlling the two auxiliary shaping jaws and the other cam disc controlling the support and the gripper.

9. Apparatus for shaping cigar bunches comprising a mould, said mould consisting of two main shaping jaws mounted to move relatively to one another in a horizontal plane, an auxiliary shaping jaw rotatable about a horizontal axis and a suitably operated support, said support being itself formed as a lower auxiliary shaping jaw.

10. Apparatus for shaping cigar bunches comprising a mould, said mould consisting of two main shaping jaws mounted to move relatively to one another in a horizontal plane, an auxiliary shaping jaw rotatable about a horizontal axis, a suitably operated support, said support having recesses and being itself formed as a lower auxiliary shaping jaw, said first named auxiliary shaping jaw being held in the closing position by locking means mounted on one of said main shaping jaws.

11. Apparatus for shaping cigar bunches comprising two pairs of jaws mounted at right angles to each other, jaws on each pair being movable towards each other and means for moving said jaws of each pair toward each other whereby a cigar bunch will be shaped to requisite form when placed between said pairs of jaws and the latter are moved together.

12. Apparatus for shaping cigar bunches comprising two pairs of shaped jaws adapted to act on said cigar bunches at right angles to each other, and means for moving each of said jaws to form a cigar bunch inserted between them.

In testimony whereof I affix my signature.

FRANZ HEINRICH BENNO STELZER.